US012110915B2

(12) United States Patent
Campbell et al.

(10) Patent No.: US 12,110,915 B2
(45) Date of Patent: Oct. 8, 2024

(54) CLEARANCE HOLE FOR SELF-PIERCING RIVET

(71) Applicant: Ford Global Technologies, LLC, Dearborn, MI (US)

(72) Inventors: Aindrea McKelvey Campbell, Beverly Hills, MI (US); Amanda Kay Freis, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 362 days.

(21) Appl. No.: 17/461,300

(22) Filed: Aug. 30, 2021

(65) Prior Publication Data

US 2021/0388860 A1 Dec. 16, 2021

Related U.S. Application Data

(60) Continuation of application No. 16/025,313, filed on Jul. 2, 2018, now Pat. No. 11,105,360, and a division of application No. 14/736,595, filed on Jun. 11, 2015, now Pat. No. 10,054,145.

(51) Int. Cl.
| | |
|---|---|
| *F16B 19/08* | (2006.01) |
| *B21J 15/02* | (2006.01) |
| *B21J 15/14* | (2006.01) |
| *F16B 5/04* | (2006.01) |
| *F16B 19/06* | (2006.01) |

(52) U.S. Cl.
CPC ........... *F16B 19/086* (2013.01); *B21J 15/025* (2013.01); *B21J 15/147* (2013.01); *F16B 5/04* (2013.01); *F16B 19/06* (2013.01)

(58) Field of Classification Search
CPC ................................. F16B 5/04; F16B 19/086
USPC ........................................................... 411/501
See application file for complete search history.

(56) References Cited

U.S. PATENT DOCUMENTS

| | | | | |
|---|---|---|---|---|
| 2,283,243 | A * | 5/1942 | Vatet | F16B 15/04 |
| | | | | 411/449 |
| 3,042,961 | A * | 7/1962 | Tieri | F16B 5/04 |
| | | | | 411/72 |
| 4,029,426 | A * | 6/1977 | Sims, Jr. | F16B 5/04 |
| | | | | 411/479 |
| 9,255,597 | B2 * | 2/2016 | Marxkors | B21J 15/147 |
| 9,555,466 | B2 * | 1/2017 | Ueda | B29C 65/7437 |

(Continued)

FOREIGN PATENT DOCUMENTS

| | | | | |
|---|---|---|---|---|
| DE | 102012005203 A1 * | 9/2013 | | B21J 15/025 |
| DE | 102014206787 A1 * | 10/2015 | | B21J 15/02 |

*Primary Examiner* — Flemming Saether
(74) *Attorney, Agent, or Firm* — Vincent Mastrogiacomo

(57) ABSTRACT

A system for attaching layers of material together comprised of a self-piercing rivet, a layer having a clearance hole through which the self-piercing rivet passes on assembly, and a layer free of a clearance hole and into which the self-piercing rivet is at least partially inserted. The system may include a third layer free of a clearance hole. The system may also include three layers wherein the clearance hole is formed in the middle layer. If the clearance hole is formed in the middle layer, the width of the hole may be greater than the diameter of the self-piercing rivet to avoid contact between the rivet and the middle layer. The layer having the clearance hole may be a hard material such as steel. One or more of the layers may be material that is difficult to pierce or can be damaged if pierced.

13 Claims, 5 Drawing Sheets

(56) References Cited

U.S. PATENT DOCUMENTS

| | | | |
|---|---|---|---|
| 9,573,186 B2* | 2/2017 | Freis | B62D 25/081 |
| 10,328,669 B2* | 6/2019 | Huff | F16B 5/02 |
| 10,900,510 B2* | 1/2021 | Wang | C22C 23/00 |
| 2003/0175095 A1* | 9/2003 | Clarke | F16B 5/04 |
| | | | 411/501 |

* cited by examiner

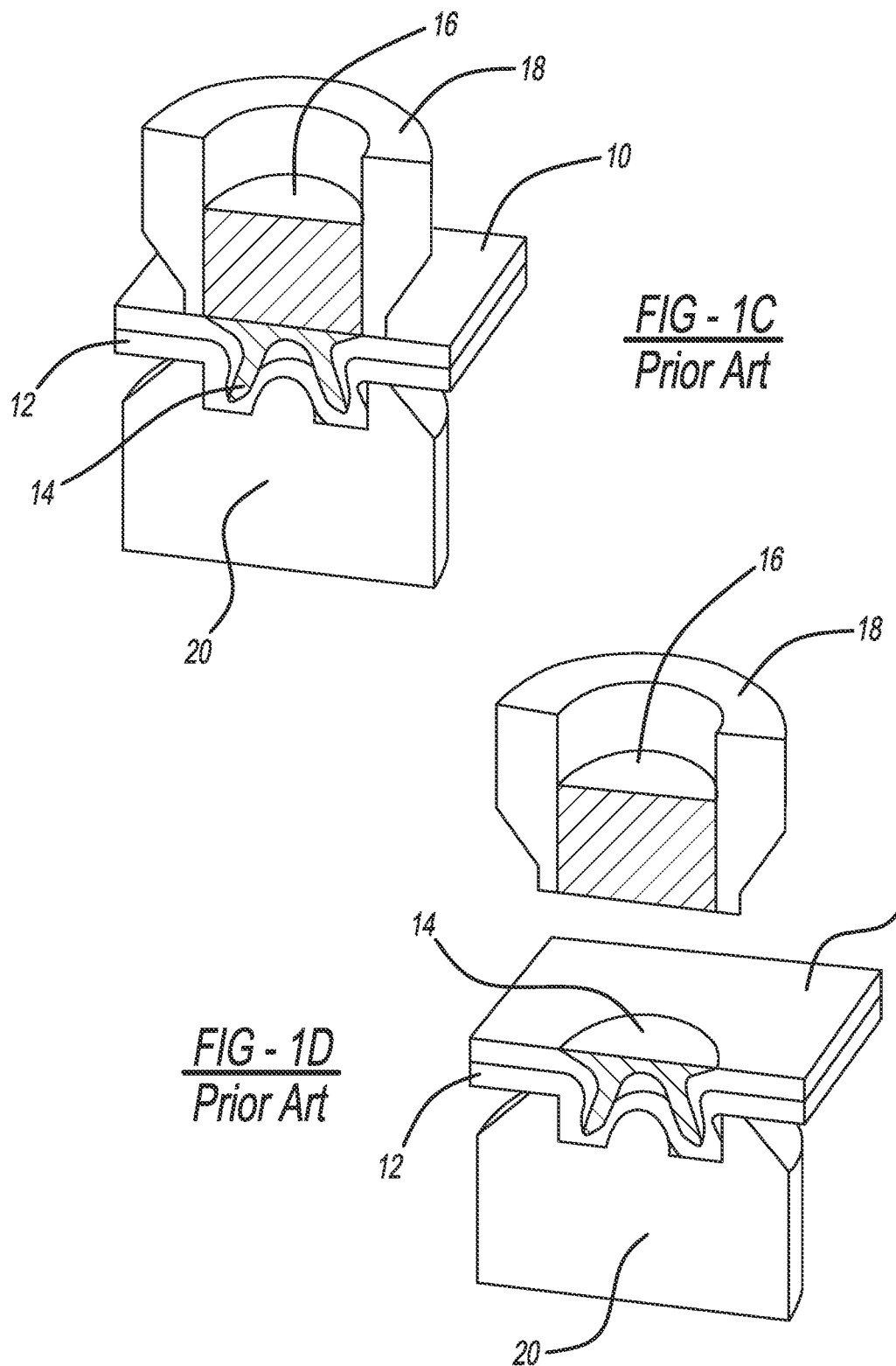

CLEARANCE HOLE FOR SELF-PIERCING RIVET

CROSS-REFERENCE TO RELATED APPLICATION

This application is a continuation application of U.S. Non-Provisional patent application Ser. No. 16/025,313, filed Jul. 2, 2018 to which and through which priority is claimed under 35 U.S.C. § 120 and of which the entire specification is hereby incorporated by reference U.S. Non-Provisional patent application Ser. No. 16/025,313 in turn is a divisional application which claims the priority under 35 U.S.C. § 120 to U.S. Non-Provisional patent application Ser. No. 14/736,595, filed Jun. 11, 2015, now U.S. Pat. No. 10,054,145 which claims the priority under 35 U.S.C. § 120 to U.S. Provisional Patent Application Ser. No. 62/011,163, filed Jun. 12, 2014, the entire disclosures of which, including the drawings, are hereby expressly incorporated by reference.

TECHNICAL FIELD

The disclosed inventive concept relates generally to self-piercing riveting systems. More particularly, the disclosed inventive concept relates to a system for use with self-piercing rivets in which a clearance hole is formed in one of the layers prior to riveting.

BACKGROUND OF THE INVENTION

The automobile manufacturing industry is constantly faced with new challenges in a wide array of areas including vehicle safety, reliability, durability and cost. Perhaps the greatest challenge faced by the automobile industry today is the need to improve fuel mileage to both decrease carbon emissions and increase fuel economy for both environmental and cost reasons, all without compromising safety, power or durability. In 2011, new fuel economy requirements were imposed that establish a US vehicle fleet average of 54.5 miles per gallon by 2025. As the industry moves to that target year fuel annual economy requirements will be ramped up for different-sized vehicles.

Efforts have been made to increase fuel economy for vehicles. These efforts can be divided into two approaches: the "supply" side and the "demand" side.

On the supply side attention is drawn to improving energy conversion efficiency through use of, for example, electric or hybrid-electric drive trains. In addition, new vehicle drive trains, including smaller engines and more efficient transmission having multiple gears and transfer cases, are being developed and employed. Other technologies, including start-stop and engine cylinder deactivation strategies, are also proving effective at decreasing fuel consumption. Improved transmissions with multiple gears are also important elements to increased fuel consumption efficiencies.

On the demand side weight reduction is key, though other aspects, such as improved aerodynamics and drag reduction, are also important. Conventional vehicles, particularly trucks, rely on steel components. For over 100 years the material of choice for most vehicles is steel. Today steel makes up about 60% of the average car by weight.

Despite the improvement in steel composition the weight of steel regardless of type remains significant. It is also possible to reduce vehicle weight when steel is used by reducing component thickness. However, at a certain point it is no longer practical to reduce steel thickness regardless of the steel grade used. The use of high strength steel or advanced, high strength steel does not improve the realization that there are limits to how much vehicle weight can be reduced by steel thickness reduction without compromising vehicle performance.

Thus as the automotive industry continues to focus on light weighting vehicles to meet customer expectations on fuel economy and CAFE requirements, interest in alternative materials including aluminum intensive vehicle applications has increased. This is because vehicle weight reduction is most directly accomplished through substituting lighter materials for currently used steel parts. However, a limited variety of materials are available as a substitute for automotive steel. One such material is carbon fiber which is both lightweight and strong.

While carbon fiber offers certain performance advantages replacement of the steel body-in-white with carbon fiber is expensive and brings with it a relatively slow production process.

Accordingly, much attention is drawn to the use of aluminum which is about ⅓ the weight of steel. Aluminum is not a new material for automotive use and has been used as a material for castings for over 100 years. The use of aluminum not only provides weight reduction but also results in good crash performance. Research has shown that in collisions aluminum can perform as well as conventional steel and demonstrates the ability to absorb twice the crash energy per pound of mild steel, having good buckling and energy absorption characteristics.

In body-in-white structures, joining methods have traditionally relied on resistance-spot welding (e.g., in steel structures). In the case of aluminum intensive vehicles and other mixed metal joining applications, self-piercing rivet (SPR) technology prevails. One advantage of SPR technology is that it is a high production volume assembly process. Further, it is compatible with an adhesive, where both methods can be used in conjunction.

The challenge often faced with SPR, however, is that the substrate material may be difficult to pierce. This can result in rivet fracture or buckling, thereby compromising joint integrity. Moreover, upon riveting the substrate material may accumulate damage which is undesirable for durability resistance. One example of this is fiber delamination in composite materials. Lastly, corrosion concerns can be introduced when a large galvanic potential exists between the rivet material versus the substrate material. This can degrade the joint integrity with time and exposure to ambient environmental conditions.

As in so many areas of vehicle technology there is always room for improvement related to the mechanical fastening of the materials through self-pierce riveting.

SUMMARY OF THE INVENTION

The disclosed inventive concept overcomes the problems associated with known systems and methods for self-pierce riveting materials together, of which some may be hard materials. The disclosed inventive concept provides a solution to these types of applications by providing a clearance hole formed in either the upper layer in the case of two layers or the middle layer in the case of three layers for the rivet. The disclosed inventive concept also has application where more than three layers of material are to be self-pierce riveted. By having one or more clearance holes formed the deformation of the substrate and the rivet is avoided, thus overcoming the challenges faced by the prior art approaches to riveting materials together.

The disclosed inventive concept also applies to joints where fiber delamination must be minimized, such as carbon-fiber composite materials. A clearance hole is placed into the composite layer, thus avoiding substrate damage during the self-pierce riveting process.

The disclosed inventive concept thus overcomes the challenges faced in industry during assembly processes where different materials are being joined. Thus an important advantage of the disclosed inventive concept is that it enables greater application of SPR joining, particularly in difficult stacks. Without this solution, the use of mixed materials and ultra-high strength and low ductility materials must be reduced, as no other low cost, automated joining solution exists.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 1C is a schematic illustration of the third step of the self-piercing rivet process according to the prior art in which the rivet has pierced the upper layer and is interlocked into the lower layer;

FIG. 1D is a schematic illustration of the fourth step of the self-piercing rivet process according to the prior art in which the rivet process has been completed and the punch and blankholder have been removed;

DETAILED DESCRIPTION OF THE PREFERRED EMBODIMENT

Figure 1A:
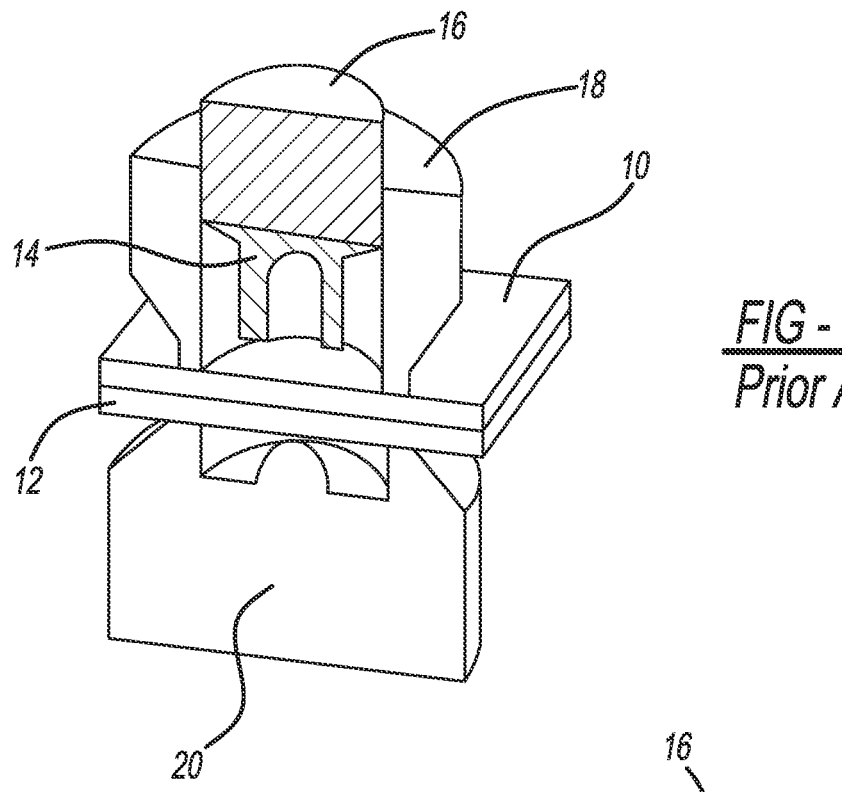
FIG. 1A is a schematic illustration of the first step of a self-piercing rivet process according to the prior art in which the blankholder and the punch are in position above the rivet prior to pressure being applied to the punch.

In the following figures, the same reference numerals will be used to refer to the same components. In the following description, various operating parameters and components are described for different constructed embodiments. These specific parameters and components are included as examples and are not meant to be limiting.

The disclosed inventive concept may find use in any number of applications where plural layers of the same or dissimilar materials are being attached. Accordingly, the disclosed inventive concept may be used in the production of automotive vehicles and trucks.

The use of self-piercing rivets in the assembly of plural components is a known technique as illustrated in FIGS. 1A through 1D. These figures schematically show steps involved in the self-piercing rivet process. As the rivet is inserted into the stack, the material deforms into the die and the resultant form is called a "button."

As illustrated in FIG. 1A, the first step of a self-piercing rivet process according to the prior art is illustrated. A first layer 10 is shown in position over a second layer 12. A rivet 14 is illustrated in position over the first layer 10. A punch 16 and a blankholder 18 are illustrated in position with the rivet 14 prior to pressure being applied to the punch 16. A die 20 is in position beneath the second layer 12.

Figure 1B:
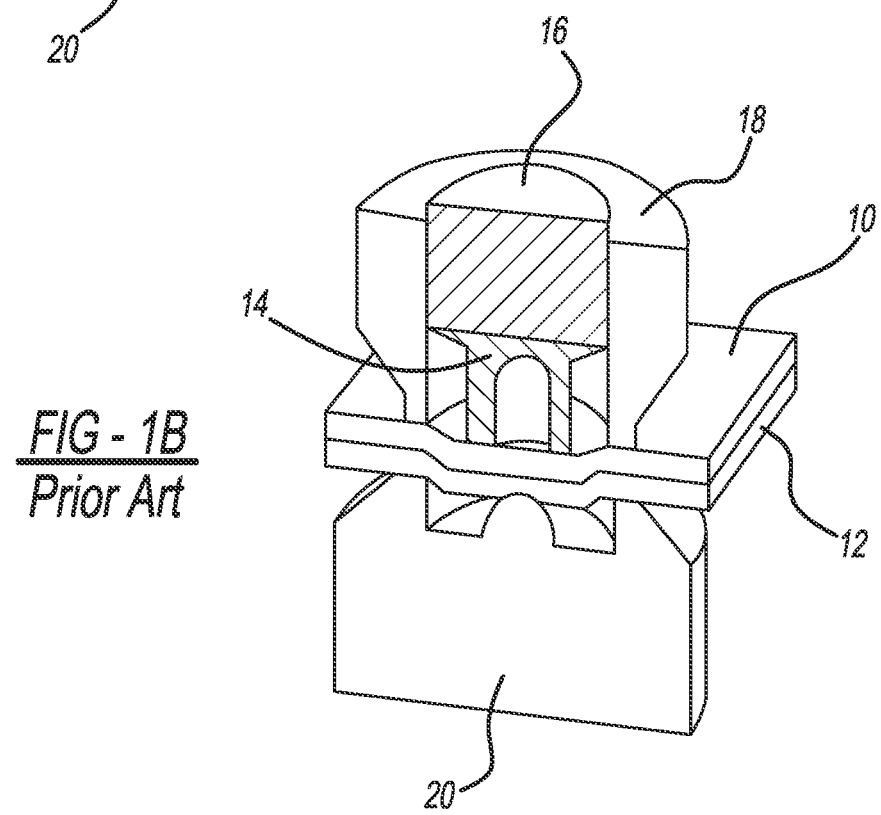
FIG. 1B is a schematic illustration of the second step of the self-piercing rivet process according to the prior art in which initial pressure has been applied to the punch.

In FIG. 1B, the second step of the self-piercing rivet process according to the prior art is illustrated. In this step, initial pressure has been applied to the punch 16 and the rivet 14 is shown beginning to deform the first layer 10 and the second layer 12.

In FIG. 1C, the third step of the self-piercing rivet process according to the prior art is illustrated. In this step, the punch 16 has been fully inserted through the blankholder 18 such that the rivet 14 pierced the first layer 10 and forms the second layer 12.

In FIG. 1D, the fourth step of the self-piercing rivet process according to the prior art is illustrated. In this step, the rivet 14 is shown fully inserted through the first layer 10 and a button is formed in the second layer 12. The punch 16 and the blankholder 18 have been moved out of contact with the first layer 10.

Figure 2:
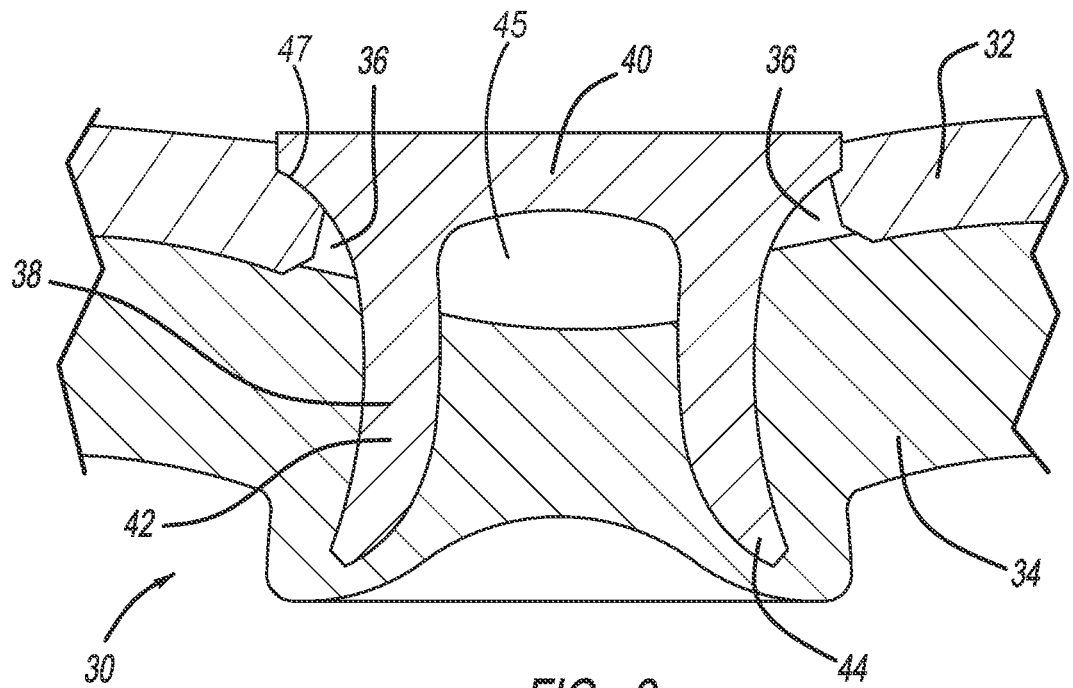
FIG. 2 is a schematic view of an arrangement according to a first embodiment of the disclosed inventive concept where a clearance hole has been formed in the upper layer of a stack-up having two layers of material.
Figure 3:
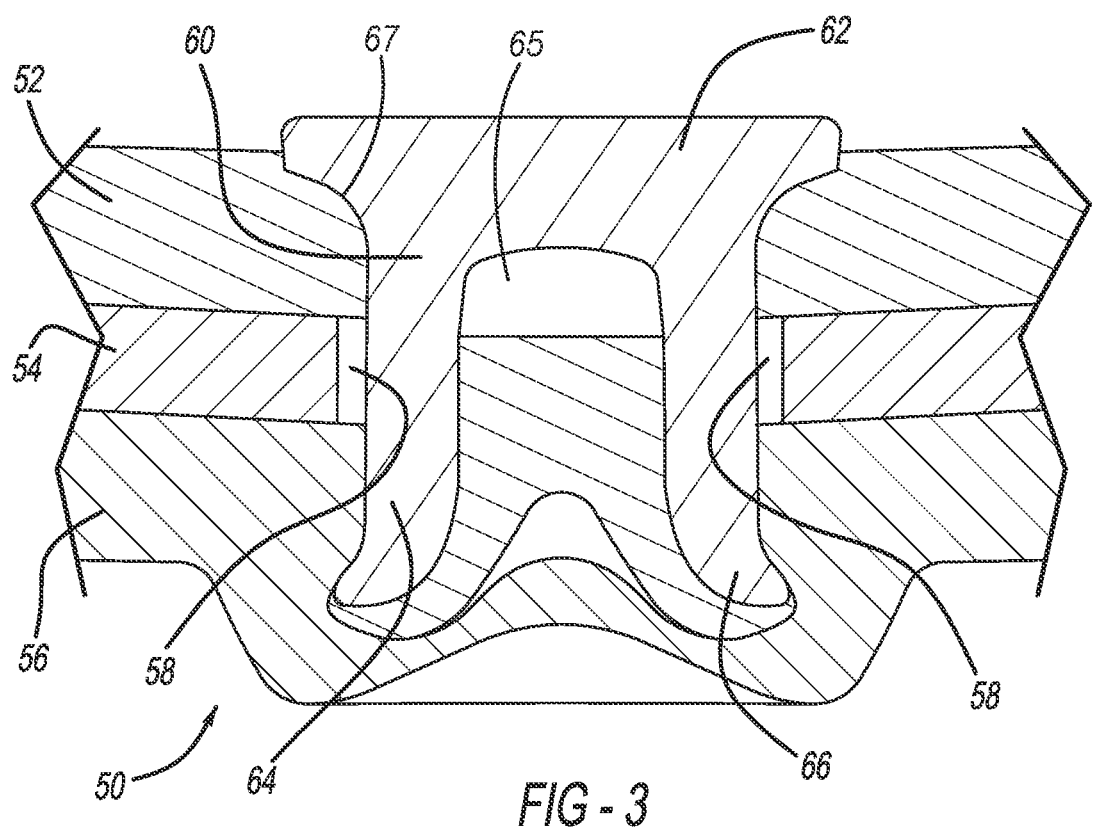
FIG. 3 is a schematic view of an arrangement according to a second embodiment of the disclosed inventive concept where a clearance hole has been formed in the middle layer of a stack-up having three layers of material.

The disclosed inventive concept may be used with any combination of two or more layers of material as shown in FIGS. 2 and 3. In FIG. 2, two layers are illustrated as being riveted. In FIG. 3, three layers are illustrated as being riveted. It is possible that more than three layers of material may be riveted according to the disclosed inventive concept.

Referring to FIG. 2, a schematic view of an assembled joint according to a first embodiment of the disclosed inventive concept, generally illustrated as 30, is shown. The joint 30 includes a material stack-up that is defined by a first layer 32 positioned over a second layer 34. A clearance hole 36 is formed in the first layer 32. The first layer 32 is a hard material that, if the clearance hole 36 is not formed before riveting, it may result in a poor mechanical connection because of rivet fracture or buckling, thereby compromising joint integrity. Such hard material might include without limitation a hard steel such as carbon steel grade (DP800).

However, the disclosed inventive concept is not limited to the formation of a clearance hole in a metal. As a non-limiting example, the disclosed inventive concept also applies to joints where fiber delamination must be minimized, such as carbon-fiber composite materials. In such a case the clearance hole is placed into the composite layer, thus avoiding substrate damage during riveting.

With the clearance hole 36 formed in the first layer 32 and the first layer 32 placed on the second layer 34, a rivet 38 is inserted through the clearance hole 36 during joining and interlocks into the second layer 34 which is composed of an unspecified sheet of material that may be the same as or different from the material of the first layer 32. The rivet 38 includes a rivet head 40 that provides a clamping force, a body 42, and a tail 44. At the intersection of the head 40 and the body 42, a sloped surface 47 is formed therein. The body 42 includes a bore 45 formed therein to define a tubular or semi-tubular rivet. The bore 45 extends from the tail 44 and terminates at the head 40.

According to the system of the disclosed inventive concept, the rivet 38 does not pierce the first layer 32 having the clearance hole 36 and thereby avoids compromising the rivet 38. The clamping force of the joint 30 is provided by the rivet head 40 of the rivet 38 which extends beyond the diameter of the clearance hole 36. However, the sloped surface 47 causes the head 40 to be at least partially rooted or embedded within the first layer 32. The piercing action results in a portion of the second layer 34 being captured within the bore 45 of the body 42 of the rivet 38. Additionally, the tail 44 interlocks with the second layer 34 due to the bore 45 permitting the tail 44 to flare outwardly and into the second layer 34.

The disclosed inventive concept may apply to material stack-ups greater than two layers as illustrated in FIG. 3. This figure illustrates a schematic view of an assembled joint according to a second embodiment of the disclosed inventive concept, generally illustrated as 50. The joint 50 includes a material stack-up that is defined by a first layer 52, a second or middle layer 54, and a third layer 56. Thus the second or middle layer 54 is sandwiched between the first layer 52 and the third layer 56. However, it is to be understood that more than three layers of material may be included in the material stack-up being riveted as illustrated in FIGS. 4 through 7 and as discussed in conjunction therewith.

A clearance hole 58 is formed in the second or middle layer 54 before the first layer 52 and the third layer 56 are placed in position on the second or middle layer 54. With the clearance hole 58 formed in the second or middle layer 54 and the first layer 52 and the third layer 56 placed on the second or middle layer 54, a rivet 60 is inserted through the clearance hole 58 during joining. The rivet 60 includes a rivet head 62, a body 64, and a tail 66 that interlocks with the third layer 56 upon joining. At the intersection of the head 62 and the body 64, a sloped surface 67 is formed therein. The body 64 includes a bore 65 formed therein to define a tubular or semi-tubular rivet. The bore 65 extends from the tail 66 and terminates at the head 62.

The first layer 52, the second or middle layer 54 and the third layer 56 may be any of a variety of materials including metals (such as steel or, more particularly, the above-mentioned carbon steel grade [DP800]) or carbon-fiber composites. However, it is generally understood that the second or middle layer 54 is a material difficult to pierce with a rivet without fracturing the rivet or causing damage to the substrate material. The materials may be the same or may be different from each other.

According to the system of the disclosed inventive concept illustrated in FIG. 3, the rivet 60 does pierce the first layer 52 and forms a button in the third layer 56 but does not pierce the second or middle layer 54 having the clearance hole 58 and thereby avoids compromising the rivet 60. The clamping force of the joint 50 is provided by the rivet head 62 of the rivet 60 that extends beyond the diameter of the clearance hole 58. The piercing action results in a portion of the first layer 52 being captured within the bore of the body 64 of the rivet 60.

When the clearance hole 58 is in one of the middle sheets, corrosion concerns are mitigated due to the lack of contact between the rivet material (often high strength boron steel, e.g. 10B37) and the substrate (e.g., magnesium alloys, including AM60), as the rivet 60 passes through a clearance hole 58.

As a further variation of the disclosed inventive concept, material stack-ups greater than three layers may benefit from the system and method of using a rivet as a mechanical fastener disclosed herein. Particularly, and referring generally to FIGS. 4 through 7, a material stack up of four layers is illustrated. However, it is to be understood that material stack-ups greater than four layers may also be formed using a rivet in conjunction with a clearance hole as provided herein.

Figure 4:
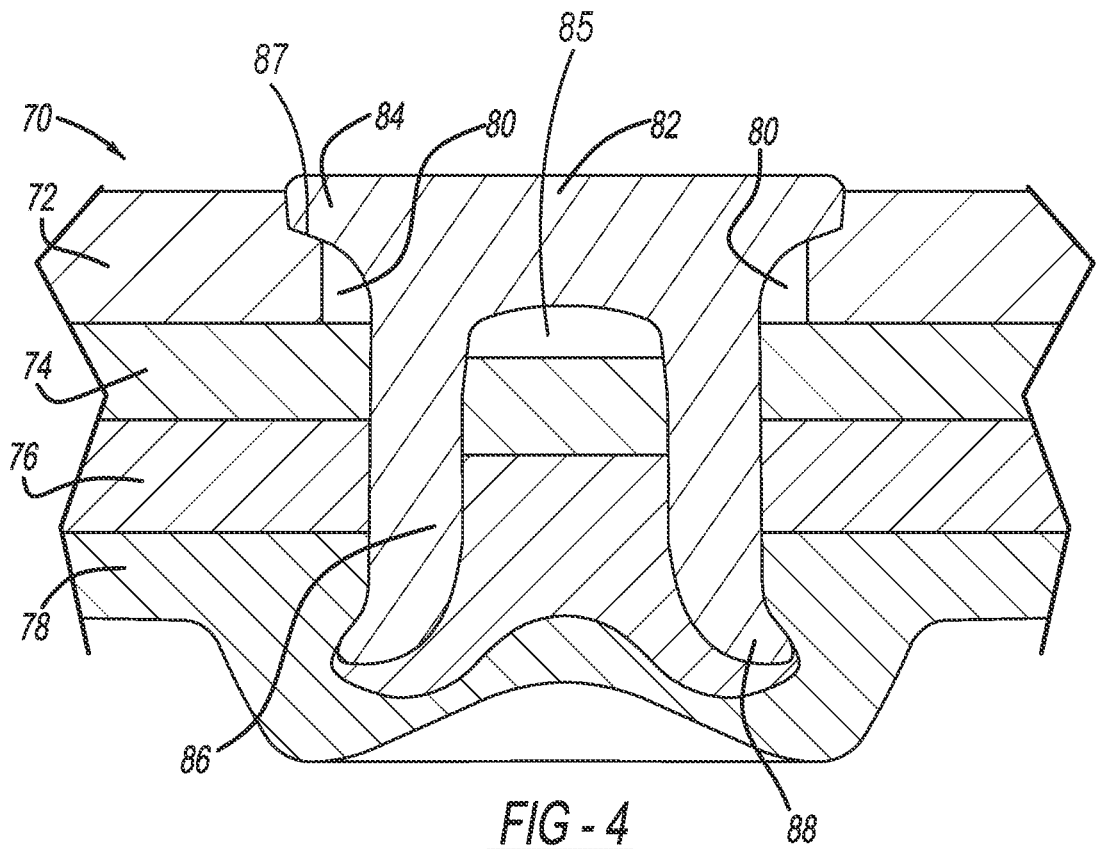
FIG. 4 is a schematic view of an arrangement according to a third embodiment of the disclosed inventive concept where a clearance hole has been formed in the top layer of a stack-up having four layers of material.

With respect to FIG. 4, a schematic view of an assembled joint according to a third embodiment of the disclosed inventive concept is shown and is generally illustrated as 70. The joint 70 includes a material stack-up that is defined by a first layer 72, a second layer 74, a third layer 76, and a fourth layer 78. Thus the second layer 74 and the third layer 76 are sandwiched between the first layer 72 and the fourth layer 78.

The first layer 72, the second layer 74, the third layer 76 and the fourth layer 78 may be any of a variety of materials including metals (such as steel or, more particularly, the above-mentioned carbon steel grade [DP800]) or carbon-fiber composites. The materials may be the same or may be different from each other.

A clearance hole 80 is formed in the first layer 72 before the layers 72, 74, 76 and 78 are sandwiched together. With the clearance hole 80 formed in the first layer 72 and the first layer 72 placed on the second layer 74, the third layer 76 and the fourth layer 78, a rivet 82 is inserted through the clearance hole 80 during joining. The rivet 82 includes a rivet head 84 that provides a clamping force. The rivet 82 further includes a body 86 and a tail 88. At the intersection of the head 84 and the body 86, a sloped surface 87 is formed therein. The body 86 includes a bore 85 formed therein to define a tubular or semi-tubular rivet. The bore 85 extends from the tail 88 and terminates at the head 84.

Upon insertion, the rivet 82 pierces the second layer 74 and the third layer 76. The tail 88 of the rivet 82 interlocks with the fourth layer 78. The piercing action results in a portion of the second layer 74 and a portion of the third layer 76 being captured within the bore of the body 86 of the rivet 82.

Figure 5:
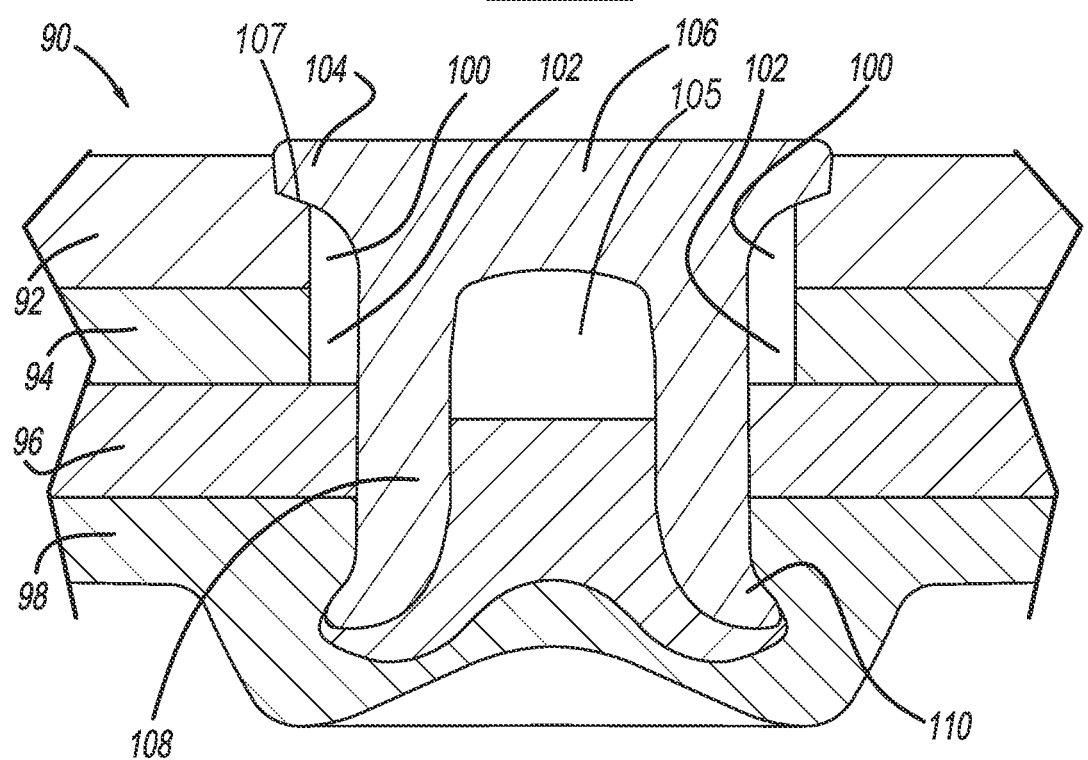
FIG. 5 is a schematic view of an arrangement according to a fourth embodiment of the disclosed inventive concept where a clearance hole has been formed in the top layer and in the second layer of a stack-up having four layers of material.

With respect to FIG. 5, a schematic view of an assembled joint according to a fourth embodiment of the disclosed inventive concept is shown and is generally illustrated as 90. The joint 90 includes a material stack-up that is defined by a first layer 92, a second layer 94, a third layer 96, and a fourth layer 98. Thus the second layer 94 and the third layer 96 are sandwiched between the first layer 92 and the fourth layer 98.

The first layer 92, the second layer 94, the third layer 96 and the fourth layer 98 may be any of a variety of materials including metals (such as steel or, more particularly, the above-mentioned carbon steel grade [DP800]) or carbon-fiber composites. The materials may be the same or may be different from each other.

A first clearance hole 100 is formed in the first layer 92 and a second clearance hole 102 is formed in the second layer 94. The first clearance hole 100 and the second clearance hole 102 are formed in the layers 92 and 94 respectively before the layers 92, 94, 96 and 98 are sandwiched together. With the first clearance hole 100 formed in the first layer 92, with the second clearance hole 102 formed in the second layer 94, and with the layers 92, 94, 96 and 98 assembled as a stack, a rivet 104 is inserted through the first clearance hole 100 and the second clearance hole 102 during joining. The rivet 104 includes a rivet head 106 that provides a clamping force. The rivet 104 further includes a body 108 and a tail 110. At the intersection of the head 106 and the body 108, a sloped surface 107 is formed therein. The body 108 includes a bore 105 formed therein to define a tubular or semi-tubular rivet. The bore 105 extends from the tail 110 and terminates at the head 106.

Upon insertion, the rivet 104 pierces the third layer 96. The tail 110 of the rivet 104 interlocks with the fourth layer 98. The piercing action results in a portion of the third layer 96 being captured within the bore of the body 108 of the rivet 104.

Figure 6:
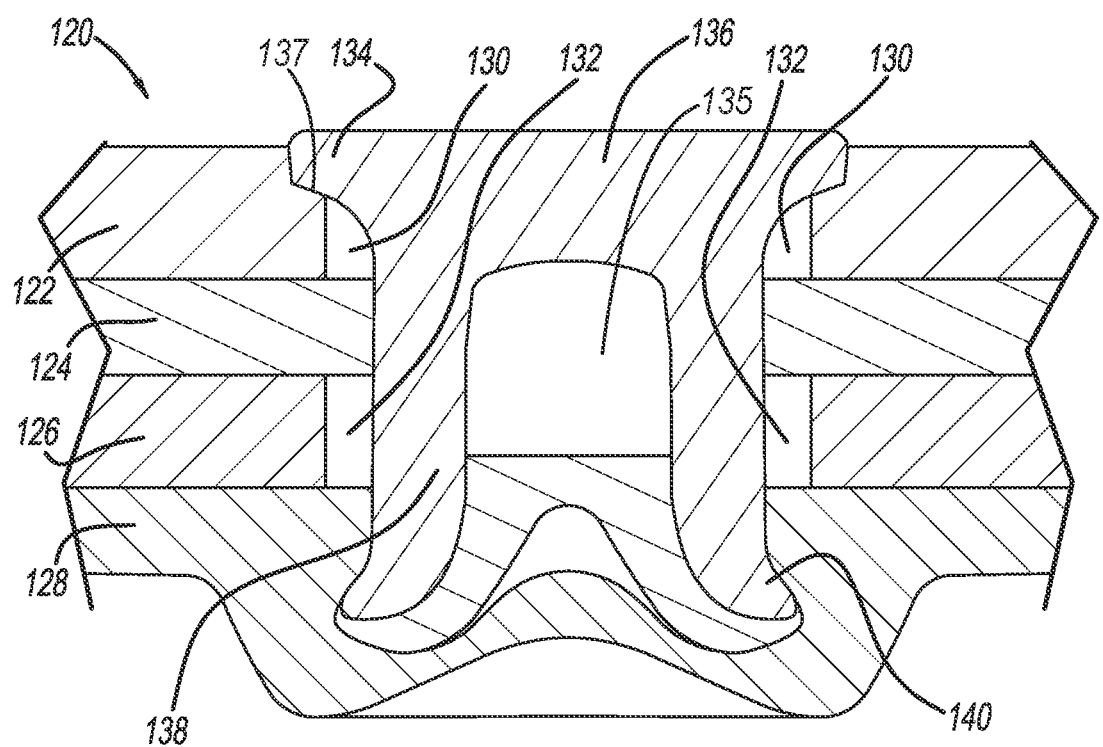
FIG. 6 is a schematic view of an arrangement according to a fifth embodiment of the disclosed inventive concept where a clearance hole has been formed in the top layer and in the third layer of a stack-up having four layers of material.

With respect to FIG. 6, a schematic view of an assembled joint according to a fifth embodiment of the disclosed inventive concept is shown and is generally illustrated as 120. The joint 120 includes a material stack-up that is defined by a first layer 122, a second layer 124, a third layer 126, and a fourth layer 128. Thus the second layer 124 and the third layer 126 are sandwiched between the first layer 122 and the fourth layer 128.

The first layer 122, the second layer 124, the third layer 126 and the fourth layer 128 may be any of a variety of materials including metals (such as steel or, more particularly, the above-mentioned carbon steel grade [DP800]) or carbon-fiber composites. The materials may be the same or may be different from each other.

A first clearance hole 130 is formed in the first layer 122 and a second clearance hole 132 is formed in the third layer 126. The first clearance hole 130 and the second clearance hole 132 are formed in the layers 122 and 126 respectively before the layers 122, 124, 126 and 128 are sandwiched together. With the first clearance hole 130 formed in the first layer 122, with the second clearance hole 132 formed in the third layer 124, and with the layers 122, 124, 126 and 128 assembled as a stack, a rivet 134 is inserted through the first clearance hole 130 and the second clearance hole 132 during joining. The rivet 134 includes a rivet head 136 that provides a clamping force. The rivet 134 further includes a body 138 and a tail 140. At the intersection of the head 136 and the body 138, a sloped surface 137 is formed therein. The body 138 includes a bore 135 formed therein to define a tubular or semi-tubular rivet. The bore 135 extends from the tail 140 and terminates at the head 136.

Upon insertion, the rivet 134 pierces the second layer 124. The tail 140 of the rivet 134 interlocks with the fourth layer 128. The piercing action results in a portion of the second layer 96 being captured within the bore of the body 138 of the rivet 134.

Figure 7:
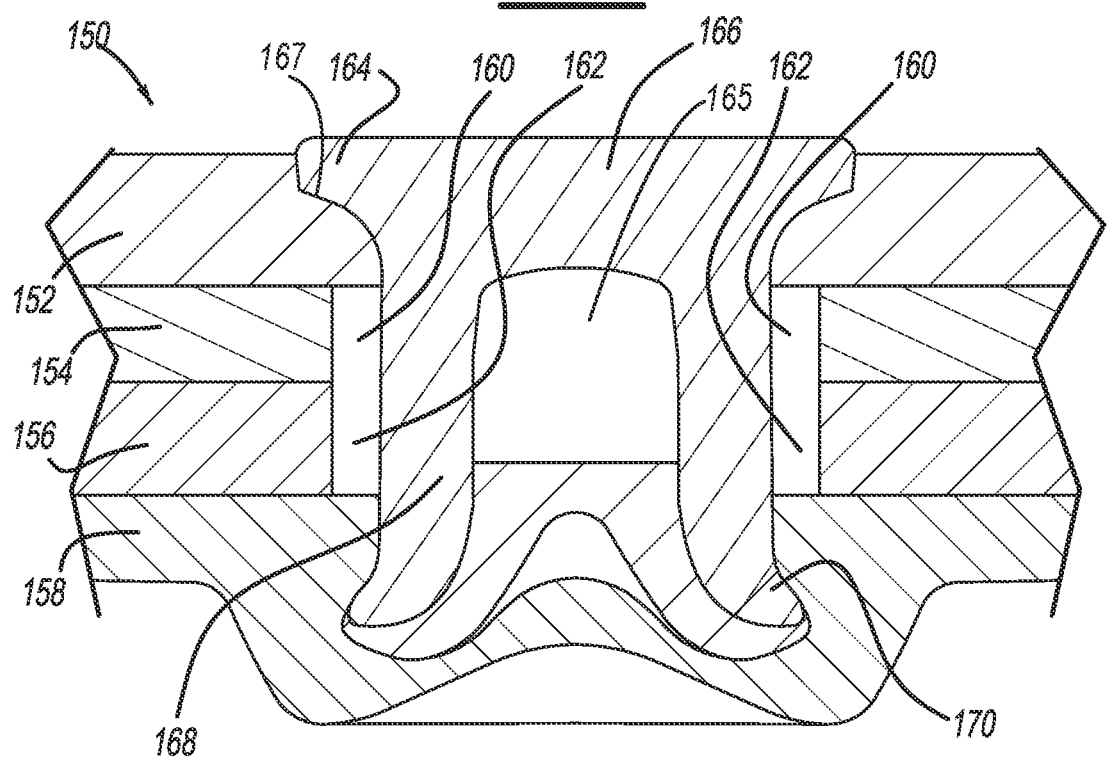
FIG. 7 is a schematic view of an arrangement according to a sixth embodiment of the disclosed inventive concept where a clearance hole has been formed in the second layer and in the third layer of a stack-up having four layers of material.

With respect to FIG. 7, a schematic view of an assembled joint according to a sixth embodiment of the disclosed inventive concept is shown and is generally illustrated as 150. The joint 150 includes a material stack-up that is defined by a first layer 152, a second layer 154, a third layer 156, and a fourth layer 158. Thus the second layer 154 and the third layer 156 are sandwiched between the first layer 152 and the fourth layer 158.

The first layer 152, the second layer 154, the third layer 156 and the fourth layer 158 may be any of a variety of materials including metals (such as steel or, more particularly, the above-mentioned carbon steel grade [DP800]) or carbon-fiber composites. The materials may be the same or may be different from each other.

A first clearance hole 160 is formed in the second layer 154 and a second clearance hole 162 is formed in the third layer 156. The first clearance hole 160 and the second clearance hole 162 are formed in the layers 154 and 156 respectively before the layers 152, 154, 156 and 158 are sandwiched together. With the first clearance hole 160 formed in the second layer 154, with the second clearance hole 162 formed in the third layer 156, and with the layers 152, 154, 156 and 158 assembled as a stack, a rivet 164 is inserted through the first clearance hole 160 and the second clearance hole 162 during joining. The rivet 164 includes a rivet head 166 that provides a clamping force. The rivet 164 further includes a body 168 and a tail 170. At the intersection of the head 166 and the body 168, a sloped surface 167 is formed therein. The body 168 includes a bore 165 formed therein to define a tubular or semi-tubular rivet. The bore 165 extends from the tail 170 and terminates at the head 166.

Upon insertion, the rivet 164 pierces the first layer 152. The tail 170 of the rivet 164 interlocks with the fourth layer 158. The piercing action results in a portion of the first layer 152 being captured within bore of the body 168 of the rivet 164.

One of the advantages of the disclosed inventive concept is that it enables greater application of self-piercing rivet joining, particularly in difficult stacks. Without this solution, the use of mixed materials and ultra-high strength and low ductility materials must be reduced, as no other low cost, automated joining solution exists.

For at least the above reasons the disclosed invention as set forth above overcomes the challenges faced by known methods for riveting multiple layers of material by forming a clearance hole in at least one of the layers of material. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A system for attaching layers of material together comprising:
   a self-piercing rivet having a head, body and tail;
   a plurality of layers, including:
   a top layer;
   a bottom layer free of a clearance hole and into which said self-piercing rivet is at least partially inserted;
   two or more middle layers provided between the top layer and bottom layer; and
   a clearance hole through which said self-piercing rivet passes during assembly in one of the: i) top layer; ii) the top layer and an uppermost layer of the two or more middle layers; iii) the top layer and a lowermost layer of the two or more middle layers; and iii) two or more of the two or more middle layers,
   wherein each clearance hole is configured to provide a hollow clearance space between the self-piercing rivet and each of the plurality of layers in which a clearance hole is provided after the plurality of layers are attached together by said self-piercing rivet with a portion of a layer of the plurality of layers in which a clearance hole is not provided being captured within the body of the rivet as the rivet pierces such layer.

2. A system for attaching layers of material together according to claim 1, wherein a clearance hole is only provided in one of the plurality of layers.

3. A system for attaching layers of material together according to claim 2, wherein the clearance hole is provided in the top layer.

4. A system for attaching layers of material together according to claim 2, wherein the layer having the clearance hole formed therein is formed from one of steel, carbon-fiber or a magnesium alloy.

5. A system for attaching layers of material together according to claim 1, wherein there are clearance holes provided in two of the plurality of layers.

6. A system for attaching layers of material together according to claim 5, wherein the clearance holes are provided in adjacent ones of the plurality of layers.

7. A system for attaching layers of material together according to claim 6, wherein the clearance holes are provided in the top and an uppermost middle layer.

8. A system for attaching layers of material together according to claim 6, wherein the clearance holes are provided in the middle layers.

9. A system for attaching layers of material together according to claim 5, wherein the clearance holes are provided in non-adjacent ones of the plurality of layers.

10. A system for attaching layers of material together according to claim 9, wherein the clearance holes are provided in top and a lowermost middle layer.

11. A system for attaching layers of material together according to claim 5, wherein the two layers having the clearance hole formed therein are formed from one of steel, carbon-fiber or a magnesium alloy.

12. A system for attaching layers of material together according to claim 1, wherein portions of two of the plurality of layers are captured within the body of the rivet.

13. A system for attaching layers of material together according to claim 12, wherein portion of each of the two or more middle layers are captured within the body of the rivet.

* * * * *